United States Patent Office
3,490,940
Patented Jan. 20, 1970

3,490,940
SIX AND EIGHT MEMBERED CYCLIC PHOSPHONIC ACID ESTERS RESULTING FROM THE REACTION OF AN OLEFIN, PHOSPHORUS, AND OXYGEN
Richard Williamson Cummins, Rahway, N.J., assignor to FMC Corporation, New York, N.Y., a corporation of Delaware
No Drawing. Filed June 30, 1965, Ser. No. 468,549
Int. Cl. C09d 5/18; C09k 3/28
U.S. Cl. 117—136
15 Claims

ABSTRACT OF THE DISCLOSURE

Six and eight membered cyclic phosphonic acid esters comprising the reaction product of an olefin, phosphorus and oxygen. The resulting esters impart fire retardant properties to a wide variety of substrates.

---

The present invention is directed to the preparation of novel phosphonic acid esters.

It is an object of the present invention to provide novel phosphonic acid esters.

It is also an object of the present invention to provide processes for preparing novel phosphonic acid esters.

Other objects and advantages of the present invention will in part be obvious and will in part become apparent from the specification.

The present invention provides novel phosphonic acid esters prepared by reacting olefins, i.e., straight chain alpha-olefins or polybutadiene, with phosphorus and oxygen, the ratio of reactant olefin to phosphorus being at least 2 moles of olefin per gram-atom of phosphorus.

The alpha olefin reactants have the formula

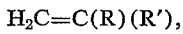

wherein R is selected from the group consisting of hydrogen, alkyls having 1 to 18 carbon atoms in the chain, monocyclicaryl, and alkaryl in which the alkyl substituent has 1 to 12 carbon atoms, and groups having the formulae —CH$_2$OH, and —C(O)OCH$_3$, and R' is selected from the group consisting of hydrogen and methyl. The reaction products are cyclic phosphonic esters having the unit structure

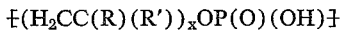

wherein $x$ is 1 or 2.

When $x$ is 2, the resultant ring structure is formed by a cyclization of a single "unit structure" to form a six-membered ring, illustrated as structure I. When $x$ is 1, an eight-membered ring structure results from the cyclization of two of the "unit structures," illustrated as structure II.

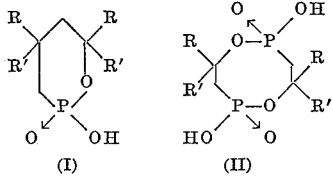

(I)        (II)

The alpha-olefin reactant as aforedescribed may be replaced with polybutadiene containing residual unsaturation to provide related phosphonic acid esters.

The reaction is carried out by contacting oxygen with a solution of the phosphorus and the olefin. When the phosphorus is soluble in the olefin reactant, the olefin may serve as the solvent. An organic solvent is most commonly employed. It is preferable to have a solvent with a low chain transfer constant. Preferred solvents include benzene and toluene. The preference for those having low chain transfer constants is a consequence of the reaction mechanism which involves a radical catalyzed mechanism with oxygen serving both as initiator and coreactant. Solvents having relatively higher chain transfer constants result in lower yields.

The reaction proceeds upon contact of oxygen with the reaction mixture. Most of these phosphonic acid esters precipitate as white solids and may be removed continuously, or may be allowed to remain in suspension until the reaction is completed. More complete precipitation may often be obtained by dilution with an aliphatic hydrocarbon such as heptane or cyclohexane. In the case of long-chain olefins, the products are appreciably soluble in benzene and are best recovered by stripping off the solvent. Isolation of the product preferably is accomplished by dissolution in carbon tetrachloride followed by precipitation with heptane.

The crude product isolated is generally a mixture of (i) a small amount of a polyolefin peroxide, (ii) the novel phosphonic acid esters, and (iii) a minor portion of an olefin·P$_2$O$_4$ product which is hygroscopic and water unstable, with subsequent hydrolysis yielding orthophosphorus and phosphonic acids. The crude product is isolated by extraction with methyl alcohol which serves as a solvent for the reaction mixture components excluding the polyolefin peroxide. The methyl alcohol-soluble fraction is precipitated from a sodium hydroxide solution by acidification, resulting in the desired phosphonic acid esters free of the unstable olefin·P$_2$O$_4$ product referred to hereinbefore. Although both the six-membered and the eight-membered ring cyclic phosphonic acid esters are obtained from the alkaline solution, establishing stability of both compounds in such solutions, it has been found that the six-membered ring compound is the more stable material of the two specified components. Heating and treatment with base may decompose the eight-member ring compound.

The reaction occurs readily upon introduction of the oxygen into the reaction solution at room temperatures, which are generally preferred for convenience of operation. The temperature, however, may be varied widely. From measurements of the oxygen pressure, the amount of oxygen uptake was determined and found generally to initially proceed slowly, rapidly increase, and then taper off over a long period of time. The time required for completion of the reaction is a function of the specific olefin reactant, the oxygen partial pressure, the temperature, and the reaction equipment. As a general rule, the higher the oxygen partial pressure, the more rapid the reaction.

The invention is further illustrated in the following examples in which all parts and percentages are by weight.

EXAMPLE 1

Benzene (268 ml.), 4.00 ml. (0.2254 g. atom) phosphorus and 272.0 ml. (1.736 mols) of 1-octene (extracted with 2 N NaOH and dried) were mixed and stirred in a 2-1 reactor fitted with a magnetic stirrer, thermometer, air inlet and gas exit, at 30° C. for 118 hrs. in a current of dry air. The reaction mixture was diluted with 1620 ml. of petroleum ether and filtered. The crude cake dried at 50° C. and 14 mm. Hg, slurried in 310 ml. of methyl alcohol (in which it largely dissolved) filtered, and the filtrate vacuum stripped to give 30.9 grams of a tan powder.

*Analysis.*—Calcd. for $C_6H_{14}O_3P$: C, 43.65; H, 8.55; P, 18.76. Found: C, 44.34; H, 8.22; P, 18.37.

The yield of product was 83.0% based on phosphorus.

The above product was then dissolved in 1 N NaOH (6 ml./g.) at temperatures up to 35° C. The solution was filtered clear. Precipitation of the methyl alcohol-soluble fraction from the 1 N NaOH solution by acidification with 1 N HCl to pH <1 gave an 88% recovery of a yellow powder.

*Analysis.*—Calcd. for $C_8H_{15}O_3P$: C, 50.52; H, 7.95; P, 16.28. Found: C, 51.57; H, 8.39; P, 17.02.

The foregoing is in good agreement with the structure $$\{CH_2-CH(C_6H_{13})OP(O)(OH)\}$$

The overall yield was 63.5% based on phosphorus. The product was a surface active agent.

EXAMPLE 2

Benzene (209 ml.), 3.12 ml. (0.1747 g. atom) phosphorus and 250.0 ml. (0.8735 mol) of 1-hexadecene (m. 2–4° C.) were mixed and stirred in a reactor like that of Example 1 at 30° C. for 163 hrs. in a current of dry air. Very little product precipitated. Product failed to precipitate on dilution with petroleum ether and was isolated by vacuum stripping at 100° C. and 5 mm. Hg. The crude product was purified by dissolution in carbon tetrachloride, and precipitated with heptane. The product was dried at 50° C. and 2 mm. Hg to give 37.9 g. of a soft yellow wax.

*Analysis.*—Calcd. for $C_{12}H_{26}O_4P$: C, 54.31; H, 9.88; P, 11.68. Found: C, 55.09; H, 10.09; P, 12.14.

The yield of the indicated composition was 81.8%. The wax was reprecipitated from 1 N sodium hydroxide solution by acidification with 6 N hydrochloric acid to give 34.5 g. of a soft yellow wax after drying at 50° C. and 2 mm. Hg. The yield of the reprecipitate product was 74.4% based on phosphorus. The wax was a monobasic acid having a H/P ratio of 0.78 by potentiometric titration. The wax was surface active. It was soluble in ethyl alcohol and chloroform.

EXAMPLE 3

1-dodecene was dissolved in benzene, and phosphorus added (dodecene-phosphorus ratio of 6.5:1), and oxygen maintained at a pressure of 530 mm. Hg applied using a two-stage regulator, for 163 hours. There was no precipitation. The solvent was vacuum stripped to obtain 37.9 grams (87% yield) of a methanol-soluble fraction having the formula $C_{12}H_{26}O_3P$, obtained from the crude by dissolution in crude $CCl_4$ (5 ml./g.) and precipitated with heptane. The acid-insoluble fraction was 34.5 g. of $C_{13}H_{27}O_3P$ (75.3% yield), which exhibited surface active properties.

EXAMPLE 4

Benzene (268 ml.), 4.00 ml. (0.2254 g. atom) phosphorus and 185.0 ml. (1.736 mols) methyl methacrylate (extracted with 2 N NaOHH and dried) were mixed and stirred in a reactor like that of Example 1 at 30° C. for 91 hrs. in a current of dry air. A white precipitate formed. The reaction mixture was diluted with 452 ml. of petroleum ether at the end of the reaction period causing the precipitation of a viscous mass. The crude product isolated by filtration, washing with petroleum ether and drying at 50° C. and 5 mm. Hg was a hard white solid weighing 82.6 g. The phosphonic acid ester fraction was separated from polymethyl methacrylate peroxide by extraction with 826 ml. of methyl alcohol and the alcohol extract vacuum stripped to give 37.6 g. of a white crystalline-like solid. The product was further purified by dissolving in water (10 ml./g.), filtering free of insolubles and vacuum stripping at 50° C. and 3 mm. Hg to give 32.5 g. of a white solid.

*Analysis.*—Calcd. for $C_5H_{10}O_5P$: C, 33.16; H, 5.57; P, 17.10. Found: C, 31.61; H, 5.27; P, 16.75.

The product, obtained in 80.1% yield based on phosphorus, was a white, odorless, crystalline dibasic acid, Hs/P=1.13; Hw/P=0.67, readily soluble in water, methyl alcohol, acetic acid and dimethylformamide but insoluble in chloroform. The elemental composition is in agreement with the unit structure $$\{CH_2C(CH_3)(COOCH_3)OP(O)(OH)\}$$

EXAMPLE 5

Phosphorus (4.0 ml., 0.2254 g. atom) was dissolved in 268 ml. of benzene and 76.6 ml. (1.127 mols) of allyl alcohol, b. 95.5–97° C., added. The resulting clear, colorless solution was stirred at 30° C. in a stream of dry air for 99 hrs. A white precipitate formed within the first hour. A test for free phosphorus was negative at the end of 99 hrs. The precipitate, isolated as in Example 4, weighed 20.3 grams.

*Analysis.*—Calcd. for $C_4H_9O_3P$: C, 35.30; H, 6.66; P, 22.76. Found: C, 33.87; H, 7.04; P, 23.77.

The yield of crude product was 66.2% based on phosphorus. It was a white, water-soluble, solid dibasic acid, Hs/P=0.45; Hw/P=0.20, largely insoluble in benzene, acetone, chloroform, dimethylformamide, and methyl alcohol. It did not support combustion. On extraction with methyl alcohol and redrying, 15.2 grams of a white solid dibasic acid, Hs/P=0.51; HwP=0.20, was obtained.

*Analysis.*—Calcd. for $C_4H_9O_2P$: C, 35.30; H, 6.66; P, 22.76. Found: C, 35.51; H, 6.56; P, 23.40.

The overall yield of methyl alcohol-extracted product was 49.6% based on phosphorus.

The methyl alcohol-extracted product on heating in boiling xylene for 46 hrs. lost 9.5% in weight to give 13.8 grams of white, water-insoluble, solid monobasic acid, H/P=0.58.

*Analysis.*—Calcd. for $C_4H_7O_3P$: C, 35.82; H, 5.27; P, 23.09. Found: C, 36.33; H, 5.52; P, 23.20.

The overall yield of water-insoluble product was 45.7% based on phosphorus. The solid was insoluble in all liquids tested except hot 96% sulfuric acid in which it dissolved with decomposition. It did not melt at temperatures up to 260° C. but formed a solid foam at higher temperatures.

The allyl alcohol product may be used to form insoluble films from water solutions which do not support combustion. It is a cationic exchanger.

EXAMPLE 6

Phosphorus (16.0 ml., 0.9016 g. atom) was dissolved in 1068 ml. of benzene and 306.4 ml. (4.508 mole) of allyl alcohol added. The clear, colorless solution was stirred at 30° C. in a stream of dry air for 168 hrs. A white precipitate formed which was collected, washed with benzene and slurried with methyl alcohol (12 ml./g.). The solids were collected, washed with methyl alcohol and dried at 50° C. and 2 mm. Hg to give 49.6 g. of white solid, $C_4H_9O_3P$. The yield based on phosphorus was 40.4%. The benzene filtrate was vacuum stripped at 100° C. and 2 mm. Hg to give 21.3 g. of a colorless syrup, $C_4H_8O_3P$. The yield of syrup was 17.5%. It was readily soluble in water and methyl alcohol but was not appreciably soluble in benzene or chloroform.

The white, water-soluble solid was evaluated as a flame retardant for cotton at phosphorus loadings of 1.7, 1.8 and 2.6%. At the 1.7 and 1.8% loadings the test strips burned their entire length (10″) with after flame times of 5–8 sec. At the 2.6% loading the strips burned 5.0 to 6.5″ with no after flame. None of the strips showed any after glow.

EXAMPLE 7

Polybutadiene of molecular weight 1000 and Iodine No. 430–440 (9.87 g., 0.1690 equivalent of unsaturation) dissolved in 120 ml. of benzene was dried over anhydrous magnesium sulfate and filtered. Phosphorus (0.60 ml., 0.0338 g. atom) was added and the resulting clear solution, in a 500 ml., one-necked flask fitted with a magnetic stirrer, oxygen inlet and 760 mm. mercury manometer, was subjected to 530 mm., pressure of tank oxygen at 30° C. Gel formation began within the first half hour. After 5.4 hrs., the oxygen uptake rate had dropped to zero and the reaction was terminated. The gel suspension gave a negative test for free phosphorus and the gel was isolated by centrifugation. After washing well with benzene, centrifuging after each washing, the gel was dried at 50° C. and 20 mm. Hg to a tan powder weighing 5.55 grams. The gel was purified by treatment with hot 6% hydrogen peroxide, isolated, washed with water and dried at 50° C. and 3 mm. Hg. A yellow solid monobasic acid, H/P=0.87, weighing 4.34 grams was obtained.

*Analysis.*—Calcd. for $C_{11}H_{18}O_4P$: C, 53.87; H, 7.40; P, 12.63. Found: C, 52.33; H, 7.12; P, 12.36.

The yield of gel of the indicated composition was 52.4% based on phosphorus. The gel is apparently a monohydrate, $C_{11}H_{16}O_3P \cdot H_2O$, containing 2.8 butadiene units per phosphonic acid ester group. Most of the remainder of the phosphorus charged, 47.6%, was found in the aqueous hydrogen peroxide wash water and was present, at least in part, as trivalent phosphorus.

EXAMPLE 8

Liquid phosphorus (16.0 ml., 0.902 g. atom) was dissolved in 800 ml. of benzene under nitrogen in a 2-1 reactor fitted with a magnetic stirrer, thermometer, air inlet and gas exit. Styrene (519 ml., 4.508 mols, extracted with 2 N NaOH and freshly distilled at 15 mm. Hg) was added and the clear solution stirred at 25–30° C. for 162 hrs. while passing dry air into the vapor space at 235 ml./min. A white precipitate began to form during the first hour. At the end of 162 hrs., the reaction mixture gave a negative test for free phosphorus with 0.1 N dimethylformamide solution of silver nitrate and was diluted with 3957 ml. of petroleum ether and filtered. The crude cake, after drying at 50° C. and 14 mm. Hg, weighed 208.0 g. It was slurried in 2080 ml. of methyl alcohol (in which it largely dissolved), filtered, and the filtrate vacuum stripped to give 195.7 g. of a light yellow powder.

*Analysis.*—Calcd. for $C_{11}H_{13}O_3P$: C, 58.92; H, 5.84; P, 13.81. Found: C, 57.58; H, 5.90; P, 13.90.

The methyl alcohol-soluble fraction (195.7 g.) was dissolved in 1 N sodium hydroxide (6 ml./g.) at temperatures up to 35° C. to give a turbid yellow solution with a strong benzaldehyde odor. The solution was filtered clear and acidified with 500 ml. of 1 N hydrochloric acid and 210 ml. of 6 N hydrochloric acid to precipitate a soft, sticky product which was washed with 1 N hydrochloric acid and vacuum dried yielding 143.4 g. of a light yellow powder having a characteristic sweet odor, m. 75°–90° C.

*Analysis.*—Calcd. for $C_{13}H_{15}O_3P$: C, 62.39; H, 6.04; P, 12.38. Found: C, 61.19; H, 5.87; P, 11.98.

The yield of product of the indicated composition, after correcting for a 12% water solubility loss was 74.0% based on phosphorus. The composition of the crude product was estimated to be 6% polystyrene peroxide, 14% olefin·$P_2O_4$ type product, $C_8H_8O_4P_2$, and 80% phosphonic acid ester, $C_{13}H_{15}O_3P$. The phosphonic acid ester on vacuum stripping at 220° C. and 2 mm. Hg lost 32.5% in weight as styrene and water; there was no loss of phosphorus. The residue was a clear, amber resin, m. 105–110° C.

*Analysis.*—Calcd. for $C_8H_9O_3P$: C, 52.19; H. 4.93; P, 16.82. Found: C, 51.10; H, 4.86; P, 16.31.

The resin on reprecipitation from 1 N sodium hydroxide by acidification with 1 N hydrochloric acid gave a yellow solid, m. 131–133° C., amounting to 53% of the original resin. It was stable on further vacuum stripping.

*Analysis.*—Calcd. for $C_{16}H_{18}O_3P$: C, 66.44; H, 6.27; P, 10.71. Found: C, 66.63; H, 6.32; P, 10.97.

The product was assigned structure I. The yield of the reprecipitated pyrolyzed product, $C_{16}H_{18}O_3P$, was 19.7% based on phosphorus.

EXAMPLE 9

Benzene (200 ml.), 4.0 ml. (0.2254 g. atom) of phosphorus and 129.8 ml. (1.127 mols) of styrene were placed in a 500-ml., one-necked flask fitted with a magnetic stirrer, oxygen inlet and 760 mm. mercury manometer. The reactor was thermostatted at 30° C., swept out with oxygen and an oxygen pressure of 530 mm. Hg applied using a two-stage regulator. The rate of oxygen uptake became negligible after 13 hrs. and a test for free phosphorus with a 0.1 N dimethylformamide solution of silver nitrate was negative at the end of this time. The heavy, white slurry was diluted with 990 ml. of petroleum ether (30°–60°) and the precipitate collected on a filter, washed with petroleum ether and dried at 50° C. and 2 mm. Hg yielding 48.0 g. of a fluffy white powder. A methyl alcohol-soluble fraction weighed 45.9 g.

*Analysis.*—Calcd. for $C_{10}H_{10}O_3P$: C, 57.41; H, 4.82; P, 14.80. Found: C, 56.62; H, 4.45; P, 13.99.

On dissolution in 1 N sodium hydroxide (5 ml./g.) and acidification with 1 N hydrochloric acid to pH less than 1, a precipitate formed which was collected, washed with 1 N hydrochloric acid and dried at 65° C. and 2 mm. Hg to give 33.4 g. of a yellow powder.

*Analysis.*—Calcd. for $C_{13}H_{13}O_3P$: C, 62.89; H, 5.28; P, 12.48. Found: C, 60.19; H, 5.35; P, 12.29.

The weight of powder corresponds to a 67.9% yield of phosphonic acid ester after correction for solubility losses. The crude product was estimated to contain 4% polystyrene peroxide, 17% olefin·$P_2O_4$ type product, and 79% phosphonic acid ester.

EXAMPLE 10

Liquid phosphorus (4.0 ml., 0.2254 g. atom) was dissolved in 200 ml. (1.734 mols) of styrene under helium and 200 ml. of cyclohexane added. The resulting solution was stirred under helium at 25° C. of 22 hours without any precipitate forming. The solution gave a heavy test for free phosphorus. The helium was replaced with dry air and within 2 hrs. a heavy white precipitate had formed.

In a companion run, with the exception of the addition of 1.81 g. of asobisisobutronitrile, the solution was stirred under helium at 50° C. for 95 hrs. The solution became viscous but remained free of precipitate. On dilution with methyl alcohol, a white precipitate formed which was collected, washed with methyl alcohol and vacuum dried to give 70.7 g. of phosphorus-free polystyrene amounting to a 39% conversion of styrene to polystyrene. The foregoing illustrate the oxygen requirements of the reaction.

The reactant olefin-phosphorus ratio largely determines the amount of the unstable olefin·$P_2O_4$ product produced. When the ratio is less than 2:1, the percentage production of the olefin·$P_2O_4$ product is increased markedly. At ratios greater than 2:1, the predominant product is the desired phosphonic acid ester product. Thus, in Example I, 31% of the product was the olefin·$P_2O_4$ material and 69% the phosphonic acid esters; in Example III, the olefin·$P_2O_4$ material was less than 2% of the product.

Earlier work reported by Willstattar and Sonnenfeld, Ber 47, 2801 (1914), and Walling et al., J. Am. Chem. Soc. 80, 4543 and 4546 (1958) disclosed the reaction of phosphorus and olefins using relatively low olefin-phosphorus ratios, e.g., 0.5:1. Their reports of their products indicated that they were largely or wholly of the olefin·$P_2O_4$ type. The reported characteristics of these products appear to confirm this.

The phosphonic acid esters of this invention have a variety of uses. They may be used as cationic exchange materials and surface active agents. Some of them may be used to provide flame-retardant properties to materials, particularly cotton. They may be used as plasticizers and as additives to gasoline and lubricants.

Although the invention has been described in connection with specific embodiments, it is to be understood that it includes all modifications and variations that come within the scope of the appended claims.

What is claimed is:

1. The process for preparing stable phosphonic acid esters comprising reacting (i) an olefin selected from the group consisting of polybutadiene and alpha-olefins, (ii) phosphorus, and (iii) oxygen, the ratio of olefin reactant to phosphorus being at least two moles of olefin per gram-atom of phosphorus.

2. The process ofr preparing six and eight member cyclic phosphonic acid esters comprising reacting
    (i) an olefin having the formula $H_2C=C(R)(R')$ wherein R is selected from the group consisting of hydrogen, alkyls having 1 to 18 carbon atoms in the chain, monocyclicaryls, alkaryls in which the alkyl substituent has 1 to 12 carbon atoms, and groups having the formulae $—CH_2OH$, and $—C(O)OCH_2$, and R' is selected from the group consisting of hydrogen and methyl,
    (ii) phosphorus, and
    (iii) oxygen
the ratio of olefin to phosphorus being at least two moles of olefin per gram-atom of phosphorus, to form cyclic phosphonic esters having the unit structure $$\{(H_2CC(R)(R'))xOP(O)(OH)\}$$

wherein $x$ is 1–2, and when $x$ is 1, the cyclic ester is an eight-member ring and when $x$ is 2, the cyclic ester is a six-member ring.

3. The process of claim 2 wherein the phosphorus and the olefin reactants are in a low chain transfer organic solvent.

4. The process of claim 3 wherein the crude reaction product is isolated by extraction with methyl alcohol, and the methyl alcohol removed to yield a solid which is then purified by dissolution in sodium hydroxide, and acidified to precipitate the desired phosphonic acid ester product.

5. The process of claim 3 wherein said solvent is selected from the group consisting of benzene and toluene.

6. The process of claim 5 wherein said olefin reactant is selected from the group consisting of 1-octene, 1-dodecene, 1-hexadecene, styrene, methyl methacrylate, and allyl alcohol.

7. The process for preparing a stable phosphonic acid ester comprising reacting polybutadiene containing residual unsaturation, with oxygen and phosphorus, the ratio of unsaturation to phosphorus being at least 2 equivalents per gram/amto of phosphorus.

8. Novel six and eight member cyclic phosphonic acid esters having the structure $$\{(H_2CC(R)(R'))xOP(O)(OH)\}$$

wherein R is selected from the group consisting of hydrogen alkyls having 1 to 18 carbon atoms in the chain, monocyclicaryl, alkaryl in which the alkyl substituent has 1 to 12 carbon atoms, and groups having the formulae $—CH_2OH$, and $—C(O)OCH_3$, and R' is selected from the group consisting of hydrogen and methyl, and $x$ is 1–2, when $x$ is 1, the cyclic ester is an eight-member ring, and when $x$ is 2, the cyclic ester is a six-member ring.

9. The product of claim 8 wherein R' is hydrogen and R is hexyl.

10. The product of claim 8 wherein R' is hydrogen and R is decyl.

11. The product of claim 8 wherein R' is hydrogen and R is tetradecyl.

12. The product of claim 8 wherein R' is methyl and R is $—C(O)OCH_3$.

13. The product of claim 8 wherein R' is hydrogen and R is $—CH_2OH$.

14. The reaction product of the reaction of polybutadiene, phosphorus, and oxygen, being a yellow solid monobasic acid having a hydrogen/phosphorus of 0.87:1, and a formula of $C_{11}H_{18}O_4P$.

15. A flame retardant cotton impregnated with the product of claim 13.

References Cited

UNITED STATES PATENTS

| | | | |
|---|---|---|---|
| 1,205,138 | 11/1916 | Willstatter | 260—971 X |
| 3,112,154 | 11/1963 | Steinhauer | 117—136 X |
| 3,179,522 | 4/1965 | Temin | 117—136 X |

FOREIGN PATENTS 465,375  5/1950  Canada.

Walling et al., J. Am. Chem. Soc. 80, 4545 (1958).

WILLIAM D. MARTIN, Primary Examiner

H. J. GWINNELL, Assistant Examiner

U.S. Cl. X.R.

117—143; 252—8.1; 260—971, 927